United States Patent
Taguchi

(10) Patent No.: US 9,190,926 B2
(45) Date of Patent: Nov. 17, 2015

(54) POWER CONVERSION CIRCUIT WITH LEAKAGE CURRENT COMPENSATION EXCEPT NEAR THE AC VOLTAGE ZERO CROSSING

(71) Applicant: DAIKIN INDUSTRIES, LTD., Osaka-shi, Osaka (JP)

(72) Inventor: Yasutaka Taguchi, Kusatsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/372,980

(22) PCT Filed: Oct. 18, 2012

(86) PCT No.: PCT/JP2012/076917
§ 371 (c)(1),
(2) Date: Jul. 17, 2014

(87) PCT Pub. No.: WO2013/111402
PCT Pub. Date: Aug. 1, 2013

(65) Prior Publication Data
US 2015/0009723 A1    Jan. 8, 2015

(30) Foreign Application Priority Data

Jan. 27, 2012   (JP) ................................. 2012-015255

(51) Int. Cl.
*H02M 1/42* (2007.01)
*H02M 5/458* (2006.01)
(Continued)

(52) U.S. Cl.
CPC ................ *H02M 5/458* (2013.01); *H02M 1/12* (2013.01); *H02M 7/48* (2013.01); *H02P 27/06* (2013.01); *H02M 7/537* (2013.01); *H02M 2001/123* (2013.01)

(58) Field of Classification Search
CPC .  H02M 2001/123; H02M 1/12; H02M 7/537; H02P 26/06
See application file for complete search history.

(56) References Cited

U.S. PATENT DOCUMENTS

| 4,975,259 | A | 12/1990 | Hyakutake et al. |
| 6,134,126 | A | 10/2000 | Ikekame et al. |
| 7,095,400 | B2 * | 8/2006 | Ho et al. ........................ 345/102 |

FOREIGN PATENT DOCUMENTS

| EP | 0980116 A2 * | 6/1999 | ............ H02M 5/458 |
| JP | 1-122910 A | 5/1989 | |

(Continued)

OTHER PUBLICATIONS

Jian Sun, "On the zero-crossing distortion in single-phase PFC converters," Power Electronics, IEEE Transactions on, vol. 19, No. 3, pp. 685-692, May 2004.*

(Continued)

*Primary Examiner* — Harry Behm
*Assistant Examiner* — Peter Novak
(74) *Attorney, Agent, or Firm* — Birch, Stewart, Kolasch & Birch, LLP

(57) ABSTRACT

A diode bridge has a pair of input ends to which an alternating current is inputted from an AC power supply, and a pair of output ends which output a direct current. A boost chopper circuit is connected to the pair of output ends, and sets up a DC voltage inputted thereto. The boost chopper circuit functions as a power factor correction circuit. A smoothing capacitor is connected to an output side of the boost chopper circuit, and smoothes the voltage across the smoothing capacitor. An inverter receives the voltage across the smoothing capacitor to apply AC power to a load. A leakage current reduction device outputs a compensating current which compensates for a leakage current leaking from the load. The leakage current reduction device outputs the compensating current, except near the zero crossing of an AC voltage inputted from the AC power supply.

9 Claims, 2 Drawing Sheets

(51) Int. Cl.
*H02M 1/12* (2006.01)
*H02P 27/06* (2006.01)
*H02M 7/48* (2007.01)
*H02M 7/537* (2006.01)

(56) References Cited

FOREIGN PATENT DOCUMENTS

| JP | 5-68375 A | 3/1993 |
|----|-----------|--------|
| JP | 11-122910 A | 4/1999 |
| JP | 2000-92861 A | 3/2000 |
| JP | 3044650 B2 | 5/2000 |
| JP | 2001-186770 A | 7/2001 |

OTHER PUBLICATIONS

John Betten & Brian King. "The Parallel Universe of Negative-Input Voltages". Power Electronics, Jul. 1, 2008. Online. http://powerelectronics.com/power-management/parallel-universe-negative-input-voltages. Accessed Apr. 10, 2015. pp. 1-4, Figs. 1-9.*
International Search Report issued in PCT/JP2012/076917, dated Jan. 22, 2013.
Son et al., "Conducted EMI in PWM Inverter for Household Electric Appliance", IEEE Transactions on Industry Applications, vol. 38, No. 5, Sep./Oct. 2002, pp. 1370-1379.

* cited by examiner

F I G. 2
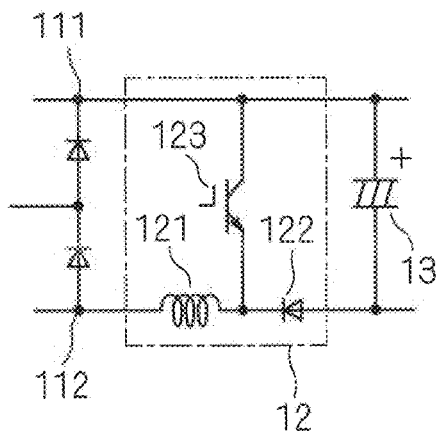
F I G. 3
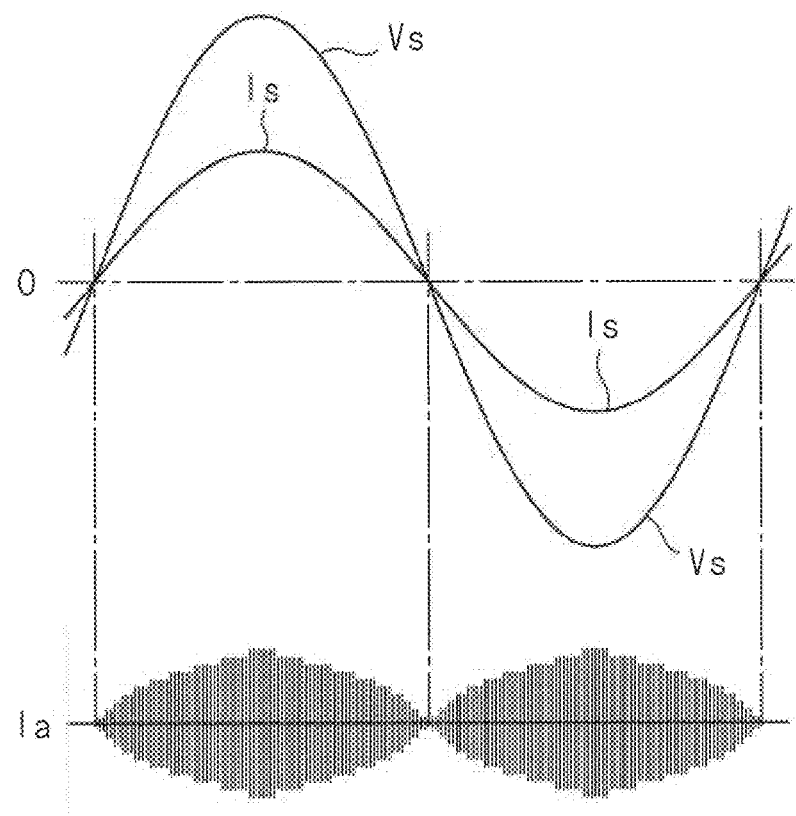

POWER CONVERSION CIRCUIT WITH LEAKAGE CURRENT COMPENSATION EXCEPT NEAR THE AC VOLTAGE ZERO CROSSING

TECHNICAL FIELD

The present invention relates to a technique for reducing a leakage current from a load.

BACKGROUND ART

Techniques for reducing a leakage current from a load have hitherto been proposed. For example, Japanese Patent No. 3044650 and Japanese Patent Application Laid-Open No. 11-122910 (1999) to be described below disclose techniques such that a compensating current supply circuit connected across a smoothing capacitor outputs a current which compensates for a leakage current from a load.

In a structure provided with no smoothing capacitor in Japanese Patent Application Laid-Open No. 2000-92861, a noise reduction circuit is provided between positive and negative input lines providing a connection between a diode bridge serving as a full-wave rectifier circuit and an inverter device. The noise reduction circuit has two transistors which perform the operation of turning on and off.

On the other hand, there are cases where a technique employing a power factor correction circuit is employed as a configuration of a power conversion circuit. In general, the power factor correction circuit is implemented by a boost chopper circuit. For example, when an object that the power conversion circuit drives is an electric motor and the electric motor drives a compressor which compresses a refrigerant for use in an air conditioner, the boost chopper circuit is used from the viewpoint of improving a heating capability at low temperatures.

The boost chopper circuit functionally has a reactor, a switch and a diode. The reactor is provided on the opposite side of the switch from a smoothing circuit.

SUMMARY OF INVENTION

Problems to be Solved by the Invention

When the techniques described in Japanese Patent No. 3044650 and Japanese Patent Application Laid-Open No. 11-122910 (1999) are applied to a power conversion circuit having a power factor correction circuit, the compensating current supply circuit operates based on a DC voltage after smoothing. And, no smoothing capacitor is employed in the technique described in Japanese Patent Application Laid-Open No. 2000-92861. In the noise reduction circuit in the technique described in Japanese Patent Application Laid-Open No. 2000-92861, the two transistors are driven to turn on and off so as to be in states opposite to each other by amplifying the voltage that detects a leakage current, by means of an amplifier.

Thus, the compensating current is outputted independently of the waveform of an alternating current inputted to the full-wave rectifier circuit in the technique described in any of Japanese Patent No. 3044650, Japanese Patent Application Laid-Open No. 11-122910 (1999), and Japanese Patent Application Laid-Open No. 2000-92861.

However, no current flows near the zero crossing of the alternating current inputted to the full-wave rectifier circuit in the power factor correction circuit, so that the diode thereof is not in a conducting state. An attempt to pass the compensating current at such a moment results in unwanted power consumption in a circuit which passes the compensating current.

The present invention has been made to solve such problems. It is therefore an object of the present invention to output a compensating current except during an interval where a leakage current is not pronounced to thereby reduce losses resulting from the passage of the compensating current.

Means for Solving the Problems

A first aspect of a power conversion circuit according to the present invention comprises: a diode bridge (11) having a pair of input ends for receiving an AC voltage (Vs), and a pair of output ends (111, 112) for outputting a direct current; a boost chopper circuit (12) connected to said pair of output ends; a smoothing capacitor (13) connected to an output of said boost chopper circuit; an inverter (14) receiving a voltage across said smoothing capacitor to output power for driving a load (4); and a leakage current reduction device (2) for outputting a compensating current (Ic) for compensating, except near a zero crossing of said AC voltage, for a leakage current (Ia) leaking from said load.

A second aspect of the power conversion circuit according to the present invention is the first aspect thereof, wherein said leakage current reduction device (2) includes a leakage current detector (21) for outputting a detection current (Ib) corresponding to said leakage current (Ia) from a difference between a pair of currents inputted to said diode bridge (11), and a compensating current output section (22) having a pair of input ends (224, 225) connected to said pair of output ends (111, 112), respectively, and a compensating current output end (223) for outputting said compensating current (Ic) in response to said detection current, said compensating current output end being connected to a location (41) Where the leakage current of said load (4) leaks.

A third aspect of the power conversion circuit according to the present invention is the first or second aspect thereof, wherein said boost chopper circuit (12) has a reactor (121) connected to one (111) of said pair of output ends which is at a high potential side, a diode (122) having an anode connected through said reactor to said one of said pair of output ends, and a cathode, and a switching element (123) connected between said anode and the other (112) of said pair of output ends which is at a low potential side.

And said smoothing capacitor (13) is connected between said cathode and said other of said pair of output ends.

A fourth aspect of the power conversion circuit according to the present invention is the first or second aspect thereof, wherein: said boost chopper circuit (12) has a reactor (121) connected to one (112) of said pair of output ends which is at a low potential side, a diode (122) having a cathode connected through said reactor to said one of said pair of output ends, and an anode, and a switching element (123) connected between said cathode and the other (111) of said pair of output ends which is at a high potential side; and said smoothing capacitor (13) is connected between said anode and said one of said pair of output ends.

A fifth aspect of the power conversion circuit according to the present invention is any one of the second to fourth aspects thereof, wherein: said compensating current output section (22) includes a first transistor (221) and a second transistor (222) which are connected in series between said pair of input ends (224, 225); said first transistor and said second transistor are different in conductivity type from each other; a control electrode of said first transistor and a control electrode of said second transistor are connected in common; a connection point where said first transistor and said second transistor are connected to each other is connected to said compensating current output end (223); and said detection current flows between said connection point and the control electrodes of said first and second transistors.

Effects of the Invention

In the first aspect of the power conversion circuit according to the present invention, the compensating current is outputted except during an interval where the leakage current is not pronounced, so that losses resulting from the passage of the compensating current are reduced.

In the second aspect of the power conversion circuit according to the present invention, the compensating current output section is not connected to the output of the boost chopper circuit but is connected between the pair of output ends of the rectifier circuit. This suppresses the operation of the compensating current output section when the leakage current is small, to thereby reduce power consumption.

In the third aspect of the power conversion circuit according to the present invention, the DC voltage to be outputted to the pair of output ends of the rectifier circuit is stepped up. This improves the power factor of the power conversion circuit.

In the fourth aspect of the power conversion circuit according to the present invention, the DC voltage to be outputted to the pair of output ends of the rectifier circuit is boosted. This improves the power factor of the power conversion circuit.

In the fifth aspect the power conversion circuit according to the present invention, the compensating current corresponding to the leakage current is passed from the connection point to the location where leakage occurs.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a circuit diagram showing another configuration of a boost chopper circuit; and FIG. 3 is a graph schematically showing a relationship between a leakage current, and an AC voltage and an AC current which are inputted to a diode bridge.

DESCRIPTION OF EMBODIMENTS

Figure 1:
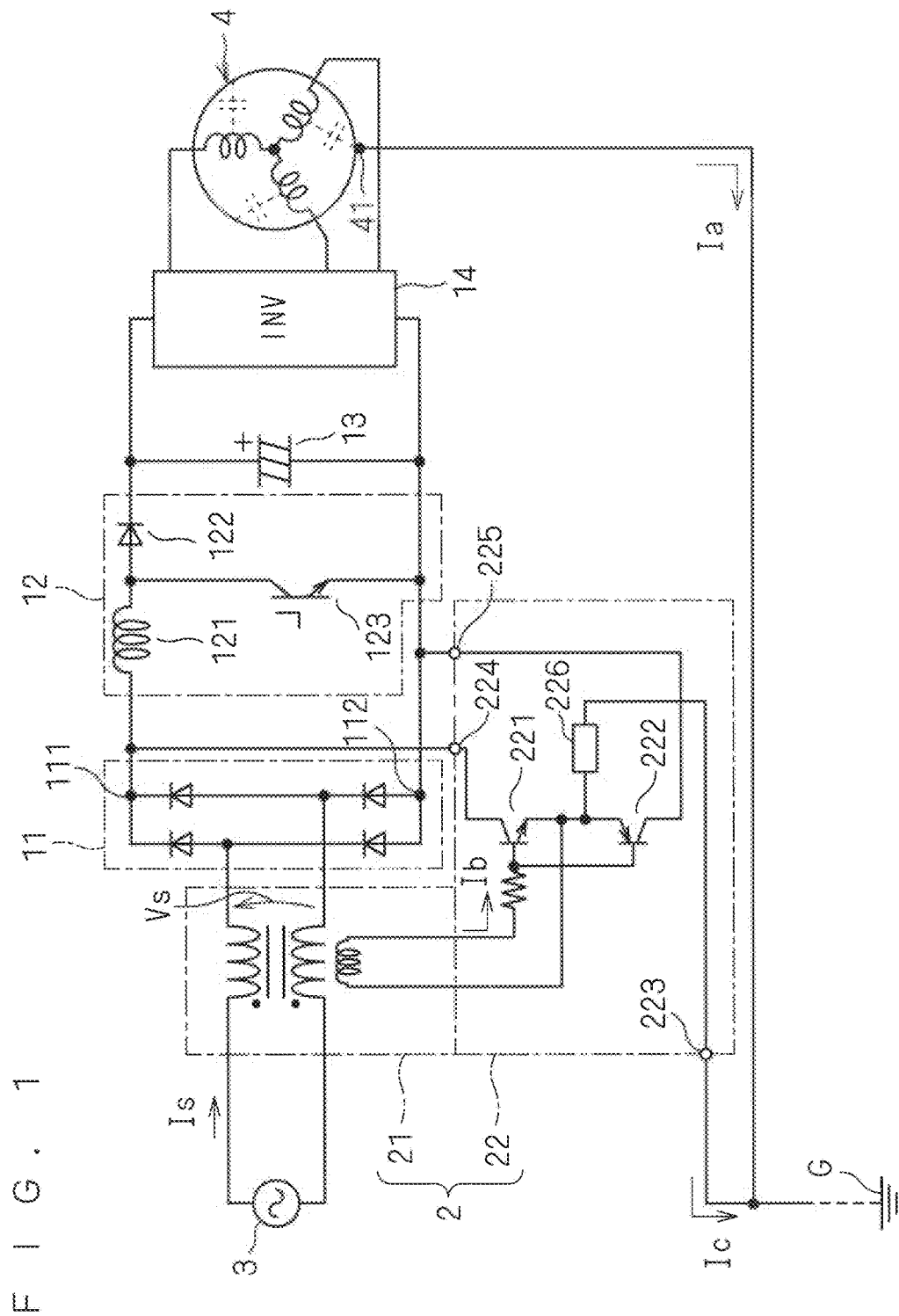
FIG. 1 is a circuit diagram showing a configuration of a power conversion circuit according to an embodiment of the present invention together with its surroundings.

FIG. 1 is a circuit diagram showing a configuration of a power conversion circuit according to an embodiment of the present invention together with its surroundings. The power conversion circuit includes a diode bridge 11, a boost chopper circuit 12, as smoothing capacitor 13, an inverter 14, and a leakage current reduction device 2.

The diode bridge 11 has a pair of input ends to which an alternating current is inputted from an AC power supply 3, and a pair of output ends 111 and 112 which output a direct current.

The boost chopper circuit 12 is connected to the pair of output ends 111 and 112, and boosts a DC voltage inputted thereto. The boost chopper circuit 12 functions as a power factor correction circuit.

The smoothing capacitor 13 is connected to an output of the boost chopper circuit 12, and smoothes the voltage across the smoothing capacitor 13.

The inverter 14 receives the voltage across the smoothing capacitor 13 to apply AC power to a load 4.

An example of the load 4 is a motor for use in a compressor for compressing a refrigerant for an air conditioner. The motor is exposed to the refrigerant and a lubricating oil together with compressing elements in the compressor, and has a stray capacitance between the motor and the contour of the compressor. In particular, the dielectric constant of the refrigerant increases in a state of what is called "migration" such that the lubricating oil is dissolved in the refrigerant. This increases the stray capacitance to make the generation of a leakage current pronounced.

The leakage current reduction device 2 outputs a compensating current Ic which compensates for a leakage current Ia leaking from the load 4. It is characteristic of the present invention that the leakage current reduction device 2 outputs the compensating current Ic except near the zero crossing of the alternating current inputted from the AC power supply 3.

As mentioned above, no current flows in the power factor correction circuit (in this case, the boost chopper circuit 12) near the zero crossing of the alternating current inputted to the full-wave rectifier circuit (in this case, the diode bridge 11). Thus, losses resulting from the passage of the compensating current Ic are reduced by passing the compensating current Ic except during an interval near the zero crossing where the leakage current Ia is not pronounced.

The boost chopper circuit 12 has a reactor 121, a diode 122, and a switching element 123. The reactor 121 is connected to a high-potential one 111 of the pair of output ends of the diode bridge 11. An anode of the diode 122 is connected through the reactor 121 to the output end 111 of the diode bridge 11. The smoothing capacitor 13 is connected between a cathode of the diode 122 and a low-potential one 112 of the pair of output ends of the diode bridge 11.

The switching element 123, which is used, for example an insulated gate bipolar transistor, is connected between the anode of the diode 122 the output end 112.

Alternatively, the boost chopper circuit 12 may have another configuration as shown in the circuit diagram FIG. 2. Specifically, in the boost chopper circuit 12, the reactor 121 is connected to the output end 112, and the cathode of the diode 122 is connected through the reactor 121 to the output end 112.

The switching element 123 is connected between the cathode of the diode 122 and the output end 111. The smoothing capacitor 13 is connected between the anode of the diode 122 and the output end 111.

Alternatively, a configuration which operate in what is called an interleaving scheme may be used for the boost chopper circuit 12.

The use of such a configuration causes the boost chopper circuit 12 to boost a DC voltage to be outputted to the pair of output ends 111 and 112 of the diode bridge 11 serving as a rectifier circuit, thereby improving the power factor of the power conversion circuit. The details of the operation, which are techniques well known the art, will not be described herein in detail.

It should be noted that the power factor correction circuit is not always in operation in the power conversion circuit. For the aforementioned power conversion circuit used for the air conditioner, for example, there are cases where the switching element 123 continues to be off (referred to also as an "off state of the power factor correction circuit" hereinafter) and where the switching element 123 is switched according to a certain duty ratio (referred to also as an "on state of the power factor correction circuit" hereinafter). In the former case, the power factor correction circuit does not substantially function as a boost chopper. In the latter case, the power factor correction circuit functions as a boost chopper. Thus, these two cases significantly differ from each other in DC voltage after smoothing. Specifically, the DC voltage after smoothing in the on state of the power factor correction circuit is higher than the DC voltage after smoothing in the off state of the power factor correction circuit.

Thus, when the leakage current reduction device 2 operates based on the voltage across the smoothing capacitor 13, it is not easy to set the compensating current Ic in the aforementioned two cases. An attempt to suitably compensate for the leakage current in the on state of the power factor correction circuit increases losses in the off state of the power factor correction circuit. An attempt to suitably compensate for the leakage current in the off state of the power factor correction circuit results in insufficient compensation in the on state of the power factor correction circuit.

From such a viewpoint, it is more desirable that the compensating current Ic is outputted except near the zero crossing of the alternating current inputted from the AC power supply 3 than that the leakage current reduction device 2 operates based on the voltage across the smoothing capacitor 13.

The leakage current reduction device 2 includes a leakage current detector 21 and a compensating current output section 22. The leakage current detector 21 outputs a detection current Ib corresponding to the leakage current Ia from a difference between a pair of currents inputted to the diode bridge 11. Specifically, the leakage current detector 21 has a common mode choke provided between the AC power supply 3 and the diode bridge 11, and a coil inductively coupled to the common mode choke. Thus, the detection current Ib flows in the coil. Such a configuration itself is well known in the art, for example, from Japanese Patent No. 3044650, Japanese Patent Application Laid-Open No. 11-122910 (1999), and Japanese Patent Application Laid-Open No. 2000-92861 described above, and will not be described in detail.

The compensating current output section 22 has a pair of input ends 224 and 225 connected to the pair of output ends 111 and 112, respectively, and a compensating current output end 223 which outputs the compensating current Ic in response to the detection current Ib. The compensating current output end 223 is connected to a location 41 where the leakage current Ia of the load 4 leaks. The location 41 is connected, for example, to a ground G. Alternatively, a parasitic impedance is present between the ground G and the location 41. The possibility that the parasitic impedance is present is indicated by a broken line between the location 41 and the ground G in FIG. 1.

The compensating current output section 22 includes transistors 221 and 222 connected in series between the pair of input ends 224 and 225 thereof. The transistors 221 and 222 are different in conductivity type from each other. Specifically, the transistor 221 is of PNP type, and the transistor 222 is of NPN type. A connection point where the transistors 221 and 222 are connected to each other is connected to the compensating current output end 223. The detection current Ib flows between the connection point and the bases of the transistors 221 and 222.

Specifically, the base serving as a control electrode of the transistor 221 and the base serving as a control electrode of the transistor 222 are connected, for example, through a resistor to the leakage current detector 21. The detection current Ib flows in the resistor, so that a base bias voltage is applied to the transistors 221 and 222.

The compensating current Ic flows from the compensating current output end 223 to the location 41. It is, however, desirable to provide an element 226 having a capacitive impedance, e.g. a capacitor, between the compensating current output end 223 and the location 41 for the purpose of cutting a direct current component from the compensating current Ic.

The configuration itself of the compensating current output section 22 is also well known in the art, for example, from Japanese Patent No. 3044650, Japanese Patent Application Laid-Open No. 11-122910 (1999), and Japanese Patent Application Laid-Open No. 2000-92861 described above, and will not be described in detail. However, the use of the boost chopper circuit 12 and the configuration in which the input ends 224 and 225 are connected to the output ends 111 and 112 in addition to the use of the boost chopper circuit 12 are not presented in Japanese Patent No. 3044650, Japanese Patent Application Laid-Open No. 11-122910 (1999), and Japanese Patent Application Laid-Open No. 2000-92861.

The compensating current output section 22 is not connected to the output of the boost chopper circuit 12 but is connected between the pair of output ends 111 and 112 of the diode bridge 11. Thus, the compensating current output section 22 does not substantially pass the compensating current Ic near the zero crossing of an AC voltage Vs inputted to the diode bridge 11 independently of the operation of the transistors 221 and 222.

FIG. 3 is a graph schematically showing a relationship between the leakage current Ia, and the AC voltage Vs and an AC current is which are inputted to the diode bridge 11.

The leakage current Ia increases with the increase in AC current Is. However, the AC current Is is small near the zero crossing of the AC voltage Vs because of the function of the boost chopper circuit 12. Thus, the reduction in leakage current Ia is effective without substantially passing the compensating current Ic near the zero crossing of the AC voltage Vs.

For reducing power losses while making the reduction in leakage current Ia effective in this manner, it is desirable that the input ends 224 and 225 are connected to the output ends 111 and 112, where the zero crossing of the AC voltage Vs is reflected, rather than across the smoothing capacitor 13.

While the invention has been described in detail, the foregoing description is in all aspects illustrative and not restrictive. It is understood that numerous other modifications and variations which have not been illustrated can be devised without departing from the scope of the invention.

The invention claimed is:

1. A power conversion circuit comprising:

a diode bridge having a pair of input ends for receiving an AC voltage, and a pair of output ends for outputting a direct current;

a boost chopper circuit connected to said pair of output ends;

a smoothing capacitor connected to an output side of said boost chopper circuit;

an inverter receiving a voltage across said smoothing capacitor to output power for driving a load; and a leakage current reduction device for outputting a compensating current for compensating, except near a zero crossing of said AC voltage, for a leakage current leaking from said load.

2. The power conversion circuit according to claim 1, wherein
said leakage current reduction device includes
a leakage current detector for outputting a detection current corresponding to said leakage current from a difference between a pair of currents inputted to said diode bridge, and
a compensating current output section having a pair of input ends connected to said pair of output ends, respectively, and a compensating current output end for outputting said compensating current in response to said detection current, said compensating current output end being connected to a location where the leakage current of said load leaks.

3. The power conversion circuit according to claim 1, wherein:
said boost chopper circuit has
a reactor connected to one of said pair of output ends which is at a high potential side,
a diode having an anode connected through said reactor to said one of said pair of output ends, and a cathode, and
a switching element connected between said anode and the other of said pair of output ends which is at a low potential side; and
said smoothing capacitor is connected between said cathode and said other of said pair of output ends.

4. The power conversion circuit according to claim 1, wherein:
said boost chopper circuit has
a reactor connected to one of said pair of output ends which is at a low potential side,
a diode having a cathode connected through said reactor to said one of said pair of output ends, and an anode, and
a switching element connected between said cathode and the other of said pair of output ends which is at a high potential side; and
said smoothing capacitor is connected between said anode and said one of said pair of output ends.

5. The power conversion circuit according to claim 2, wherein:
said boost chopper circuit has
a reactor connected to one of said pair of output ends which is at a high potential side,
a diode having an anode connected through said reactor to said one of said pair of output ends, and a cathode, and
a switching element connected between said anode and the other of said pair of output ends which is at a low potential side; and
said smoothing capacitor is connected between said cathode and said other of said pair of output ends.

6. The power conversion circuit according to claim 2, wherein:
said boost chopper circuit has
a reactor connected to one of said pair of output ends which is at a low potential side,
a diode having a cathode connected through said reactor to said one of said pair of output ends, and an anode, and
a switching element connected between said cathode and the other of said pair of output ends which is at a high potential side; and
said smoothing capacitor is connected between said anode and said one of said pair of output ends.

7. The power conversion circuit according to claim 2, wherein:
said compensating current output section includes a first transistor and a second transistor which are connected in series between said pair of input ends;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

8. The power conversion circuit according to claim 5, wherein:
said compensating current output section includes a first transistor and a second transistor which are connected in series between said pair of input ends;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

9. The power conversion circuit according to claim 6, wherein:
said compensating current output section includes a first transistor and a second transistor which are connected in series between said pair of input ends;
said first transistor and said second transistor are different in conductivity type from each other;
a control electrode of said first transistor and a control electrode of said second transistor are connected in common;
a connection point where said first transistor and said second transistor are connected to each other is connected to said compensating current output end; and
said detection current flows between said connection point and the control electrodes of said first and second transistors.

* * * * *